Jan. 7, 1958   H. J. NEIDHART   2,819,060
NON-RESONANT SPRING DEVICES HAVING ELASTIC
CUSHIONING RINGS
Filed Jan. 11, 1954   2 Sheets-Sheet 1

Inventor
Hermann Joseph Neidhart
by Sommers + Young
Attorneys

Jan. 7, 1958  H. J. NEIDHART  2,819,060
NON-RESONANT SPRING DEVICES HAVING ELASTIC
CUSHIONING RINGS

Filed Jan. 11, 1954  2 Sheets-Sheet 2

Inventor
Hermann Joseph Neidhart
by Sommers & Young
Attorneys 2,819,060

United States Patent Office

Patented Jan. 7, 1958

2,819,060

NON-RESONANT SPRING DEVICES HAVING ELASTIC CUSHIONING RINGS

Hermann J. Neidhart, Geneva, Switzerland

Application January 11, 1954, Serial No. 403,359

Claims priority, application Switzerland January 16, 1953

9 Claims. (Cl. 267—1)

The present invention relates to a buffer for the resilient damping of impacts or for the supporting of loads, in which elastic rings are arranged between opposite conical surfaces disposed in concentrically spaced, partially telescoped relationship.

Devices of this kind have been proposed which show a ring lying between an inner and an outer rolling surface and opposing at increasing resistance any axial displacement of the said surfaces relative to one another. Such devices can be developed in groups, for example arranged one on top of the other.

According to the present invention I provide a buffer comprising in combination: conical elements arranged coaxially to, and partly overlapping one another, and elastic rings arranged between the said elements in contact with the surfaces thereof facing one another, at least two of the said rings differing from one another in their characteristics.

The difference in the characteristics may consist according to the invention for example in that the rings have different diameters or that they have different cross sections, or in that they are differently prestressed or deformed to a different extent by being rolled over about their own circular center lines, or that in one of the rings stresses are set up in the manner described while another is left free from such stresses, etc. The difference may also consist in the materials, or the primary substances or the production method thereof. It can generally be considered a criterion of the difference between the rings that they produce different effects under static or dynamic loading, and for example undergo differently strong flattening under the same load, and in particular have different resonance frequencies and oppose harmonic oscillation differently than would rings of equal constitution, or effect different damping or produce a different spring graph diagram.

In order that the invention may be clearly understood and readily carried into effect, some embodiments thereof will now be described by way of example with reference to the accompanying drawings, in which.

Figure 1:
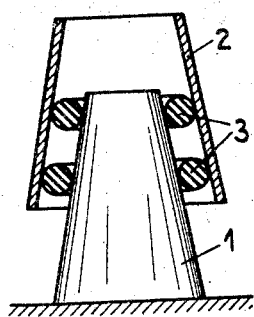
Fig. 1 shows diagrammatically a first embodiment in axial section in the unloaded condition.
Figure 2:
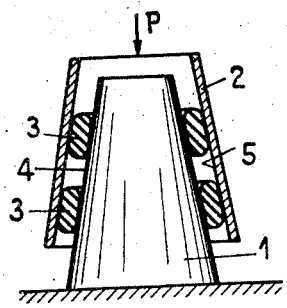
Fig. 2 shows the same embodiment in the loaded condition.

The buffer diagrammatically shown in Figs. 1 and 2 comprises two conic elements 1 and 2 which are movable in relation to one another and which are supported in concentrically spaced, partially telescoped relationship by two rubber rings 3 in such a manner that the elements 1 and 2 can axially displace themselves and to a certain extent also tilt with respect to one another. The element 1 is substantially frusto-conically shaped and may be solid or hollow, while the element 2 is constructed as a funnel. The rolling surfaces 4, 5 facing one another of the elements 1, 2 are conical and run at an equal distance from one another i. e., have the same degree of convergence. The rubber rings 3 may be inserted loosely so that they can roll freely along the surfaces offered up to them. Alternatively the rubber rings 3 may be inserted with advantage pre-loaded between the said rolling surfaces. The rings may be alternatively produced as closed toroid bodies by vulcanising them in a mould, to produce the effects described hereinafter with reference to Figs. 6 and 7, or various other roller forms may be employed, examples of which have been disclosed in the prior art.

When loading the buffer illustrated in Fig. 1 by an axial force P, the rubber rings 3 assume the shape shown in Fig. 2. In order to prevent the rubber rings from slipping along the rolling surfaces, the latter may be roughened by sand-blasting, or they may be fluted, grooved circumferentially, knurled etc. Slipping of the rings relative to the rolling surfaces may be prevented even by the selection of suitable materials having a high coefficient of friction relative to one another.

Figure 3:
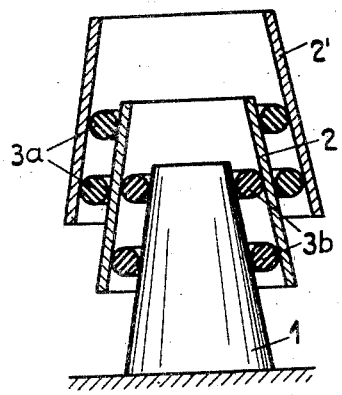
Fig. 3 shows a second embodiment in axial section.

In the embodiment illustrated diagrammatically in Fig. 3 two external funnel shaped elements 2, 2' are provided in contradistinction to the embodiment shown in Figs. 1 and 2. Such a buffer serves for bringing more rings into play in a space confined in height than would be possible according to Fig. 1, and also for allowing a larger resilient deformation than according to Figs. 1 and 2.

Figure 4:
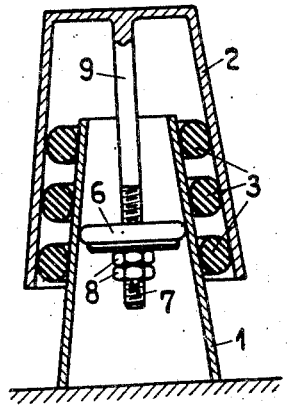
Fig. 4 shows a third embodiment in axial section.

In the embodiment according to Fig. 4, three rubber rings 3 are provided which are arranged at equal distances from one another; this buffer comprises a locking body 6 e. g. of rubber, wood, artificial material, fabric or metal, for the limitation of the return motion after complete or partial relief. This locking body is adjustable by means of a screw thread 7 and an adjustment nut 8, and is arranged on a bolt 9 which is fixedly connected to the element 2.

Alternatively the locking body could be formed conically and could rest on the inner wall surface of the hollow element 1 by means of at least one rubber ring.

In all these embodiments the rings may be inserted with preloading (compressive or tensile stresses) or without the same. In the latter case, a plurality of rings spaced axially to run between the same pair of opposed conical surfaces inherently have different internal diameters and different external diameters, both proportioned to the degree of convergence of the conical surfaces and to the axial spacing of the rings, and where the conical surfaces have the same angle of convergence, the cross sections of the rings are inherently the same. On the other hand, where the rings are preloaded, in compression, or in tension, or both, wide latitude exists for varying their relative cross sections and internal and external diameters. The elastic rings have in the original shape conveniently a round profile or a section deviating but little therefrom.

Advantageously the rings are provided as regards their number and volume in such a manner that in embodiments in which the same body is contacted by a series of rings from inside and by another series of rings from outside, these series are tuned with respect to one another as regards their potential energy i. e. power of taking up compression, frequency and resonance to the extent desired. This applies in an appropriate manner to all the embodiments.

The angles of the rolling surfaces with respect to the direction of movement influences the relation between the changes in load and the resilient deformation, and are accordingly chosen with advantage in such a manner that the conditions desired are attained.

The number of the rings which cooperate is by no means limited to two or three, but can be selected as large as the conditions in practice make it appear desirable. The properties of the rings can be identical with the exception of those of at least two rings, but all can be different amongst themselves.

Figure 5:
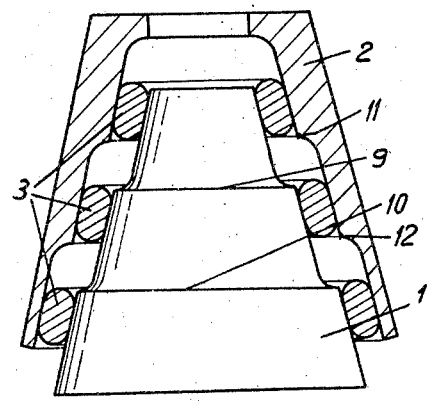
Fig. 5 shows a fourth embodiment in part-section.

When the angle of the rolling surfaces in relation to the direction of movement is so small that the desired result of the difference in the ring diameters would not be attained, the rolling surfaces may be stepped as shown in Fig. 5.

The buffer shown diagrammatically in Fig. 5 comprises two elements 1, 2 which are supported moveably relative to one another by three rubber rings 3 in such a manner that the elements 1, 2 can be moved axially and can even be tilted to some extent with respect to one another.

The inner element 1 is stepped at 9 and 10, and the outer element at 11 and 12.

Rings which are produced in moulds and accordingly put up a resistance to being rolled over about the axis 13 of their material (Figs. 6 and 7) could be prestressed by twisting about this axis. The ring according to Fig. 6, consisting for example of rubber, is illustrated in cross section as taken out of the production mould. It has then no torsional stresses. The outer periphery of the ring which is viewed in cross section lies where the small circles 14 are applied as markers and is in any case substantially larger than the inner circumference of the ring, which is denoted by the two points 15 and their connecting line 16.

Figure 6:
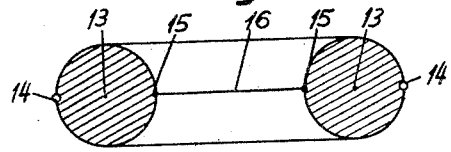
Figs. 6 to 9 show details in section across the resilient rings, on a larger scale.
Figure 7:
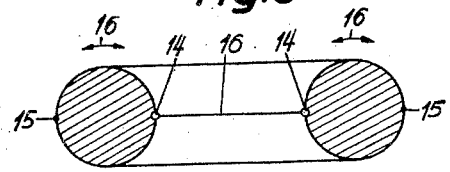

Considerable resistance is offered to rolling it over for example 180° as illustrated in Fig. 7 where the initially outer periphery, marked by the small circles 14, of the ring comes to lie inside, and the inner circumference, marked by the points 15, of the rings comes to lie outside. In the position according to Fig. 7 the inner stresses of the ring are in an unstable equilibrium. The slightest impulse in one of the directions indicated by the arrows releases the torsional force applied which has been accumulated and which acts as a restoring force until the position free from stresses of the ring according to Fig. 6 is reached.

This kind of prestressing, too, can be made use of in that one or more of the rings are brought into a condition of torsional stress which adds itself to the compressive stress generated by the loading, or subtracts itself therefrom, and accordingly acts opposite to, or with, the load.

This kind of pre-loading of one or more rings allows to influence the characteristic of resiliency very markedly.

Figures 8, 9:
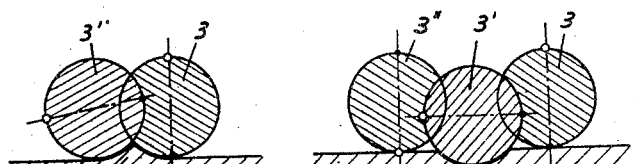

The torsional stressing of the rings according to Figs. 6 and 7 can be set up so that the same are rolled in accordance with Fig. 8 over an annular hump 17 of the inner or outer element. Whereas the ring 3, when fitted loosely, is free from any stress, it acquires the same when being rolled over the hump 17. The counter-face applied to it in this position upon loading the buffer twists the same further, even beyond the unstable equilibrium, as the case may be. The action of the ring is accordingly composed of the component of pure pressure by the two conical elements, viz. the inner and the outer element, and the component of torsion, which substantially influences the spring characteristic according to whether it acts in the positive or negative sense, and according to the degree of twisting.

Instead of the annular hump according to Fig. 8, a circular groove could be used as shown in Fig. 9. The ring 3 lies outside the groove 18 prior to being rolled over; it is then rolled into the same, and from there turned further out of the groove by means of the opposite surface. However, the ring 3 could be put directly into the groove 18 and could be twisted from there out of the groove by means of the opposite surface.

The angles of the rolling surfaces in relation to the direction of movement influence the relation between the change of load and the resilient deformation. Depending on the manner of operation of the buffer, the rolling surfaces can be arranged equal or with different slope with respect to the axis of symmetry.

While I have hereinabove described, and shown in the accompanying drawings what may be considered typical and particularly useful embodiments of my invention, I wish it to be understood that I do not limit myself to the details and dimensions described and illustrated for obvious modifications will occur to a person skilled in the art.

What I claim as my invention and desire to secure by Letters Patent, is:

1. A resilient device of the character described comprising inner and outer members disposed for relative reciprocation along a substantially rectilinear path, said inner member having at least one elongated, outwardly frusto-conical surface converging in one direction along said path and said outer member defining at least one elongated, inwardly frusto-conical surface converging in the same direction along said path, the surfaces of said members, respectively, being disposed in concentrically spaced, partially telescoped relationship, and a plurality of toroidal elastic rings, each coaxially disposed between said members in circumferential engagement with an opposed pair of said frusto-conical surfaces thereof and in axially spaced relationship, whereby relative rectilinear movement of said members along said path to move said surfaces into further telescoped relationship will roll said rings axially along said surfaces while radially and elastically compressing the rings therebetween to provide elastic resistance to such movement, at least two of said rings differing in their elastic response to deformation.

2. A device according to claim 1 in which at least two of said rings are selected to have different resonant frequencies of elastic deformation to provide resistance to harmonic relative oscillation of said members along said path.

3. A device according to claim 1 in which said rings have different internal diameters.

4. A device according to claim 1 in which said rings have different internal diameters and, in the same proportion, different external diameters.

5. A device according to claim 1 in which said rings are at all times maintained under circumferential tension in the assembly.

6. A device according to claim 1 in which said rings are at all times maintained under radial compression in the assembly.

7. A device according to claim 1 in which said rings are at all times maintained under circumferential tension and radial compression in the assembly.

8. A device according to claim 1 in which said surfaces have the same degree of convergence.

9. A device according to claim 1 in which each of said members includes correspondingly converging, relatively offset, concentric frusto-conical surface portions of decreasing diameter connected by surface portions that converge more abruptly to provide stepwise convergence of said members in said one direction, and in which said elastic rings respectively engage different ones of said offset frusto-conical surface portions of each of said members.

References Cited in the file of this patent
UNITED STATES PATENTS

| | | |
|---|---|---|
| 2,066,187 | Piron | Dec. 29, 1936 |
| 2,179,959 | Schroedter | Nov. 14, 1939 |
| 2,189,870 | Sluyter | Feb. 13, 1940 |
| 2,460,829 | Ivanovic | Feb. 8, 1949 |
| 2,462,011 | Thiry | Feb. 15, 1949 |
| 2,510,979 | Ivanovic | June 13, 1950 |
| 2,538,955 | Efromson et al. | Jan. 23, 1951 |
| 2,697,578 | Whittam | Dec. 21, 1954 |

FOREIGN PATENTS

| | | |
|---|---|---|
| 269,273 | Switzerland | Oct. 2, 1950 |
| (Corresponding Great Britain 691,303, May 13, 1953) | | |
| 453,213 | Great Britain | June 8, 1935 |